United States Patent [19]

Schulz

[11] Patent Number: 4,950,309

[45] Date of Patent: * Aug. 21, 1990

[54] PROCESS FOR THE CONVERSION OF TOXIC ORGANIC SUBSTANCES TO USEFUL PRODUCTS

[75] Inventor: Helmut W. Schulz, Harrison, N.Y.

[73] Assignee: Dynecology Incorporated, Harrison, N.Y.

[*] Notice: The portion of the term of this patent subsequent to Sep. 26, 2006 has been disclaimed.

[21] Appl. No.: 257,648

[22] Filed: Oct. 14, 1988

Related U.S. Application Data

[63] Continuation-in-part of Ser. No. 106,144, Oct. 7, 1987, Pat. No. 4,869,731, which is a continuation of Ser. No. 786,165, Oct. 9, 1985, abandoned, which is a continuation of Ser. No. 584,571, Feb. 29, 1984, abandoned.

[51] Int. Cl.$^5$ ................................. C10J 3/46
[52] U.S. Cl. ........................... 48/197 R; 48/197 A; 48/206; 48/209; 252/373; 252/376; 423/648.1; 423/655; 423/DIG. 20
[58] Field of Search .................... 48/202, 206, 197 R, 48/209, 203, 200, 201; 585/240; 252/373; 423/648.1, 655, 656

[56] References Cited

U.S. PATENT DOCUMENTS

| 2,175,610 | 10/1939 | Linde | 48/206 |
| 2,764,554 | 9/1956 | Sellers et al. | 252/376 |
| 3,671,209 | 6/1972 | Teichmann et al. | 48/209 |
| 4,052,173 | 10/1977 | Schulz | 48/202 |
| 4,530,702 | 7/1985 | Fetter et al. | 48/209 |
| 4,574,714 | 3/1986 | Bach et al. | 48/197 R |

FOREIGN PATENT DOCUMENTS 1435088 5/1976 United Kingdom ................. 48/202

OTHER PUBLICATIONS

Coffman et al., Power from Wastes via Steam Gasification, 1978, A.C.S., 98197r.

Primary Examiner—Peter Kratz
Attorney, Agent, or Firm—Thomas H. Whaley

[57] ABSTRACT

Toxic refractory organic substances are decomposed by reaction with oxygen and steam at a temperature in the range of 2500° F. to 3200° F. Such toxic refractory organic compounds as PCB's, may be completely destroyed without contamination of the environment.

7 Claims, 1 Drawing Sheet

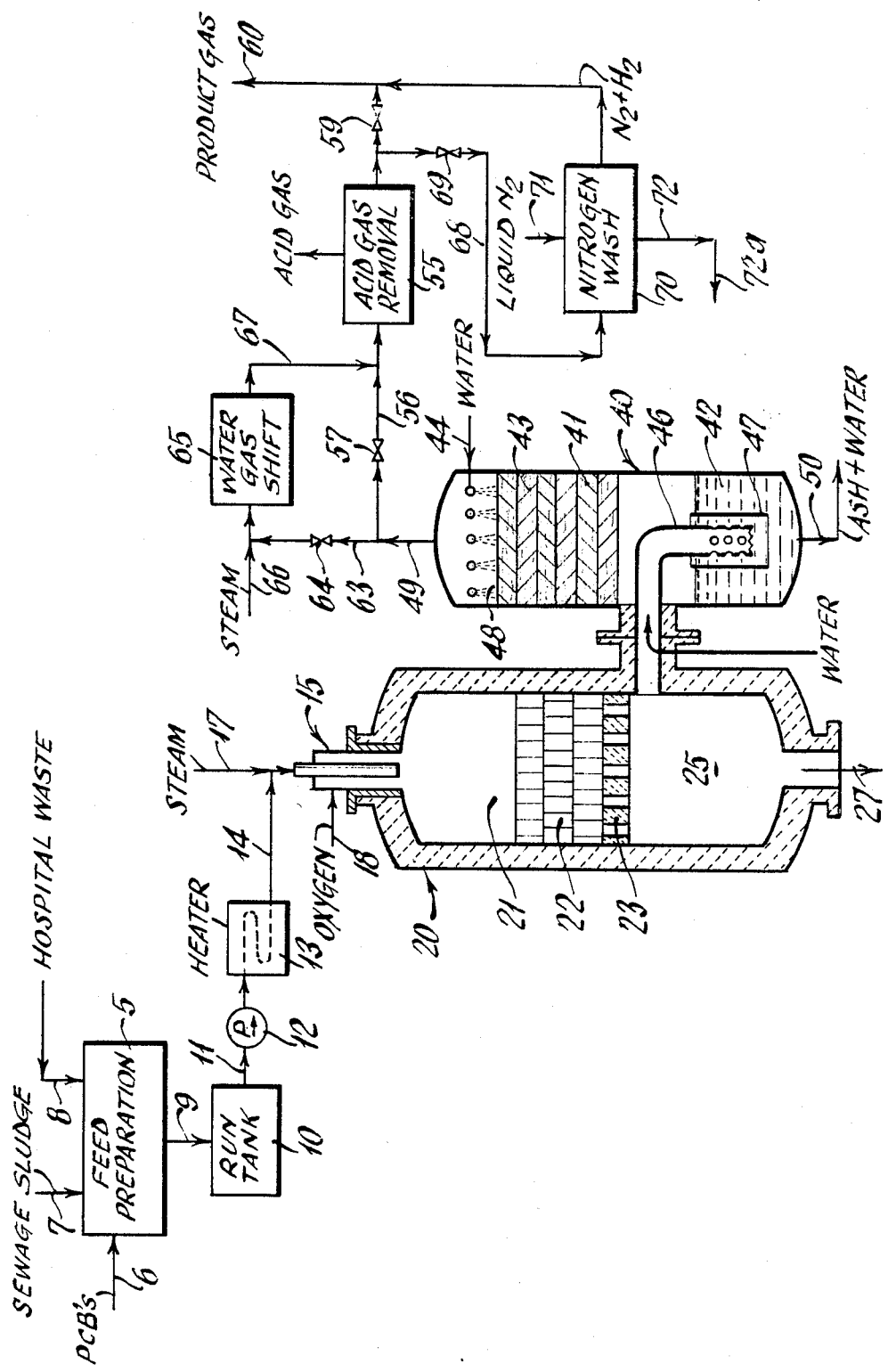

PROCESS FOR THE CONVERSION OF TOXIC ORGANIC SUBSTANCES TO USEFUL PRODUCTS

This application is a continuation-in-part of copending U.S. patent application Ser. No. 07/106,144, filed Oct. 7, 1987, now U.S. Pat. No. 4,869,731, which is a continuation of application Ser. No. 786,165 filed Oct. 9, 1985, now abandoned which in turn is a continuation of application Ser. No. 584,571 filed Feb. 29, 1984, now abandoned.

There are a number of toxic organic substances that are so resistant to both thermal degradation and biological degradation that their improper disposal results in severe environmental pollution problems. These toxic organic substances usually undergo only partial destruction in conventional incinerators with the result that unreacted or partially oxidized toxic compounds are discharged with the stack gases into the atmosphere and may subsequently cause pollution of the air, soil, and waterways. Other hazardous wastes, particularly municipal sewage, hospital wastes, and biochemical wastes, present serious disposal problems in areas of high population density.

This invention relates to a process for the decomposition by partial oxidation of toxic organic substances that are unusually resistant to thermal degradation, as well as those wastes which may be destroyed by incineration, without pollution of the environment. In this process, the toxic refractory organic substances are exposed to an oxidizing medium and steam at a temperature in the range of 2500° F. to 3200° F. in a combustion chamber in which the resultant partial oxidation products containing hydrogen and carbon monoxide are contacted with incandescent carbon and/or an incandescent inorganic oxide. By means of this procedure, refractory organic substances are typically decomposed with an efficiency of at least 99.9999 percent in a single pass through the partial combustion zone. After the removal of solids and gaseous inorganic decomposition products by conventional scrubbing and refining techniques, the exit gas, which comprises carbon monoxide, methane, and hydrogen, may be used as a fuel or synthesis gas.

The costs of disposal of biological and biomedical wastes in a manner which is not detrimental to the environment are rapidly increasing. As a result of the increasing costs of disposal and the ever increasing volume of such wastes, harmful and illegal dumping of such wastes is becoming more prevalent. In the summer of 1988, for example, numerous beaches along the Atlantic seacoast were closed due to pollution of the waters with polychlorinated biphenyls, abnormally high coliform bacteria counts and the washing up of medical wastes, including contaminated blood samples and syringes. Organic wastes, such as untreated sewage and sewage sludge, have a high biological oxygen demand (BOD) for their decomposition by natural biological processes. The quantities of untreated sewage and sewage sludge dumped into the Atlantic Ocean offshore of the Northeastern Coastal States have reached the point where dolphins (porpoises) and other marine life is being extinguished due to the lack of oxygen in the coastal waters.

It is a primary object of this invention to provide an improved and ecologically acceptable method for not only destroying such wastes, but also producing valuable gaseous products. Numerous methods have been proposed for destruction of these noxious wastes by incineration or direct oxidation. U.S. Pat. No. 4,052,173 to Helmut W. Schulz, for example, discloses a method for the destruction of solid wastes by charging a mixture of the solid waste and coal to the top of a vertical shaft furnace where the mixed feed is gasified with steam and oxygen. U.S. Pat. No. 4,530,702 to Fetters et al describes a process in which biomass pellets are reacted with air in a downwardly moving bed and PCB's are introduced in admixture with heated air into the hottest part of the bed. In the process of U.S. Pat. No. 3,671,209 to C. F. Teichmann et al, beneficiated garbage is mixed with fuel oil and gasified by reaction with oxygen and steam in an unpacked, non-catalytic reactor. There still remains a need for a highly efficient method of destroying such wastes and noxious substances completely and without air or water pollution.

The process of this invention for the destruction of toxic refractory organic substances may be superimposed on an efficient, energy-producing gasification process that operates at temperatures substantially higher than those of air-supported incinerators. In this way the quantitative thermal destruction of toxic refractory organic substances is accomplished at a negligible increase in the cost of producing a clean, medium BTU fuel gas or synthesis gas.

While the process of this invention can be used to destroy any organic substance that is resistant to thermal and biological degradation, it is of particular value in the destruction of those refractory organic substances that are toxic to living organisms and that when subjected to heating in conventional incinerators yield toxic degradation products that when released into the atmosphere cause serious pollution problems. Such toxic materials include dioxins; polyhalogenated biphenyls; organophosphates, such as Parathion; halogenated biocides, such as hexachlorobenzene, Chlordane, DDT, and 2,4,5-trichlorophenoxyacetic acid; and waste streams from the production of these toxic substances. Other toxins and potentially hazardous wastes, e.g., municipal sewage wastes and hospital wastes, may be destroyed and converted to useful fuel gas, hydrogen or synthesis gas.

In the process of this invention, the toxic refractory organic substance is reacted with an oxidizing medium under conditions so controlled as to maintain a flame or combustion temperature in the range of 2500° F. to 3200° F., preferably in the range of 2800° F. to 3100° F., in a reaction chamber that may have a refractory lining and/or that may contain incandescent carbon or incandescent refractory oxides, such as alumina or zirconia. The high temperature environment is created and maintained by the partial oxidation of the refractory organic substance, incandescent carbon, or both.

The refractory organic substance, e.g. toxic waste, that is introduced into the combustion chamber may be in the form of a liquid, a gas, or a solution or suspension of a solid in a combustible organic liquid.

The oxidizing medium used in this process may be a gas, such as oxygen, oxygen-enriched air, or air that has been sufficiently preheated to sustain the desired flame temperature; or a liquid, such as nitrogen tetroxide. Oxygen or oxygen-enriched air containing at least 95 volume percent oxygen and preferably containing at least 99 percent oxygen is the preferred oxidizing agent.

Steam is fed to the gasification chamber to maintain the reaction temperature in the desired range, that is, between 2500° F. and 3200° F., and to provide a reducing atmosphere beyond the partial combustion zone or flame.

The amount of oxygen or other oxidizing medium that is fed into the reaction chamber is dependent upon such factors as the properties of the toxic refractory organic substance and the apparatus in which the degradation of the refractory substance is to be effected. Excellent results have been obtained using the amount of oxidizing medium that is required stoichiometrically for complete combustion of the refractory material as well as more or less than this amount. When the refractory substance is destroyed in a gasifier or in a combination of a torch and a gasifier, the amount of oxidizing medium used is that required for the partial oxidation of the refractory substance and the gasification of the carbonaceous fuel so as to generate a temperature of at least 2500° F. The total amount of oxygen supplied to the reaction zone as free oxygen and combined oxygen is preferably at least five percent more than that amount required stoichiometrically for conversion of all of the carbon in the feed to carbon monoxide.

The relative amounts of steam and oxidizing medium that are used are so regulated as to maintain the desired reaction temperature by balancing the exothermic partial combustion reaction:

$$C + \tfrac{1}{2}O_2 = CO$$

with the endothermic watergas reaction:

$$C + H_2O = CO + H_2$$

The mixture of partial and complete combustion products leaving the gasifier may be quenched with water or passed through a heat exchanger for the recovery of heat and into a conventional scrubber for the removal of noxious inorganic decomposition products, such as hydrogen chloride, hydrogen sulfide, or ammonia. The scrubbed product gas may be used as a synthesis gas or fuel. Any solid inorganic impurities introduced with the carbonaceous feed material may be withdrawn from the hearth of the gasifier in the form of a molten slag or recovered as solids from the scrubber.

The process of this invention may be carried out in any suitable and convenient apparatus in which the refractory organic material can be exposed to an oxidizing medium and steam at a temperature in the range of 2500° F. to 3200° F. for a period of 5 to 500 milliseconds or longer. The process is preferably carried out in a gas generator provided with a mixer/burner or torch, a slagging gasifier, or a combination thereof. For example, the process may be carried out in an alumina-lined reaction chamber having inlets for the feed stream, steam and oxidizing medium; an oxypropane torch may be provided as a pilot light. The chamber may be fitted with zirconia cylinders, bricks, rods, saddles, or bars. The thermal decomposition may also be carried out in a slagging, moving-burden gasifier, such as the gasifiers described in detail in U.S. Pat. No. 4,340,397 and U.S. Pat. No. 4,052,173.

In one of the preferred embodiments of the invention, the refractory organic substance is introduced into an unobstructed portion of the reaction chamber that is designed to provide a residence time of 5 to 500 milliseconds or more wherein it is reacted with an oxidizing medium and steam at a temperature of 2500° F. to 3200° F. The partial oxidation products are then contacted with refractory inorganic surfaces that comprise the walls and internal packing of the reaction chamber which have been heated to incandescence by the reaction products. Steam is fed to the partial combustion zone of the reaction chamber to maintain the temperature in the desired range and to provide a reducing atmosphere beyond this zone. The completely and partially oxidized reaction products leaving the reaction chamber are passed through a heat exchanger and into a scrubber. The scrubbed product which contains substantially no toxic compounds may be employed as a synthesis gas or fuel.

A preferred embodiment of the process of this invention is illustrated in the FIGURE which is a diagrammatic representation of apparatus suitable for carrying out the process.

With reference to the drawing, in this specific example of the process, the toxic materials in this example are polychlorinated biphenyls, municipal sewage sludge and comminuted cellulosic hospital waste supplied to a feed make up tank 5 through lines 6, 7, and 8, respectively. In make up tank 5, dry sewage sludge from line 7, containing up to about 10 percent moisture by weight, is mixed with sufficient liquid PCB's from line 6 to form a pumpable slurry. Optionally, shredded cellulosic hospital waste containing non-cellulosic solids, e.g., glass, plastic and metal contaminants comminuted to a particle size passing a 10 mesh screen Tyler Standard Screen Scale sieve, may be included in the feedstock in addition to or in place of the sewage sludge. The hospital waste is preferably hammermilled and screened to prepare it as feedstock prior to wetting with the carrier liquid comprising PCB's. Oversize solid particles separated from the shredded waste are preferably recycled to the hammermill and ultimately fed to the gasifier.

The slurry of particulate solids and PCB's prepared in the feed preparation stage 5 is passed through line 9 to run storage tank 10 of a size sufficient to provide a substantially consistent feed composition to the gasifier. The concentration of solids in the feed stream range from about 1 to about 15 weight percent depending upon the bulk density of the solids.

From run tank 10, the slurry is passed through line 11 by pump 12 to preheater 13 wherein the carrier liquid, essentially PCB's, may be partially vaporized and the organic solids dehydrated and in some cases partially decomposed at preheat temperatures ranging from 200° F. up to 600° F. or higher.

The preheated feed stream from heater 13 passes through line 14 to the torch or burner 15 where it is mixed with steam from line 17 and oxygen from line 18 and discharged into the primary reaction zone 19 of gasifier 20. Suitable mixer/burners are disclosed in U.S. Pat. Nos. 2,928,460; 3,847,564 and 3,874,592 incorporated herein by reference. Gasifier 20 may operate at a pressure in the range of 15 to 1500 psig, preferably in the range of 150 to 450 psig.

Gasifier 20 suitably comprises a steel vessel having a refractory liner, for example, a vessel similar to that described in U.S. Pat. No. 2,818,326 to duBois Eastman et al or those disclosed in U.S. Pat. No. 4,343,625.

The interior of gasifier 20 is provided with two distinct reaction zones, i.e. a primary reaction zone 21 free from catalyst or packing and a secondary reaction zone 22 containing a gravitating bed of incandescent carbon, or refractory metal oxide packing or contact surfaces, e.g. brick checkerwork, saddles, Raschig rings, cylinders or spheres of alumina, zirconia or silica supported on a grate 23. The refractory packing material in secondary reaction zone 22 may comprise one or more catalysts, particularly nickel or iron which may originate from the solid organic waste supplied to gasifier 20 from line 7 or 8.

In operation the interior of gasifier 20 is autogenously maintained at an operating temperature in the range of 2500° F. to 3500° F., suitably in the range of 2800° F. to 3200° F. by partial combustion of organic components of the feedstock producing a highly reducing atmosphere comprising hydrogen and carbon monoxide. In the secondary reaction zone 22, refractory toxic compounds, e.g. PCB's and their organic decomposition products which have not been completely destroyed by oxidation in primary reaction zone 21 are further reacted in to complete destruction of toxic wastes and form acid gases, eg. HCl and $H_2S$, which are not difficult to recover from the product gases. The residence time in the secondary reaction zone is one or more seconds.

The hot gaseous products from the secondary reaction zone 22 comprising carbon oxides, hydrogen and methane pass through grate 23 together with molten ash and metals into slag trap 25 from which the molten solids may be discharged through outlet 27 into a suitable quench vessel (not illustrated). Suitable slag receivers and quench vessels are disclosed in U.S. Pat. Nos. 4,343,625; 4,444,726; and 4,474,584 incorporated herein by reference.

Hot gases are discharged from slag trap 25 through outlet 28 into quench vessel 40. As illustrated, quench vessel 40 comprises a cylindrical pressure vessel containing a direct water quench zone 42 adapted to hold a body of water and a gas scrubber zone 43. Hot gases from quench zone 25 of gasifier 20 are introduced into quench vessel 40 through a dip tube 45 into which water is injected through line 41. Dip tube 46 is surrounded by an open draft tube 47 and discharged into water contained in the quench zone 42 effecting rapid cooling of the hot gases, trapping solid ash and slag particles, and generating additional steam. The quenched gas stream rises through the scrubbing section 43 of vessel 40 wherein it is scrubbed with water introduced through line 44 to distributor 46 at the top of vessel 40. The water from line 44 flows downwardly over packing material 48, suitably in the form of ceramic rings, further cooling and cleaning the gas stream. Cooled, washed gas is discharged from vessel 40 through line 49 for disposal or further processing as described hereinafter. Water containing accumulated solids withdrawn from the bottom of vessel 40 through line 50 may be recycled as steam to gasifier 20 through line 17 to avoid pollution of the environment. Ultimately, the solids are converted to or trapped in slag discharged from the gasifier 21 through outlet 27. The residual slag volume is relatively small and substantially inert.

Cooled gases discharged from quench vessel 40 through line 49 may be passed directly to a gas purification unit 55 through line 56 as controlled by valve 57 for removal of water and acid gases, e.g. carbon dioxide, carbonyl sulfide and hydrogen sulfide, and delivered via line 58 to product gas line 60 as controlled by valve 59. This product gas is useful as fuel gas and is substantially completely free from PCB's and other toxic refractory organic compounds. A number of acid gas removal processes suited for this purpose are known in the art. A preferred method involves selective absorption of the acid gases in a solution of ethanolamine. The acid gases are discharged from the system through line 61 for further processing.

In one specific embodiment of the process of this invention, the gases from line 49 are passed through line 63 as controlled by valve 64 to a water gas shift reactor 65. Steam for the water gas shift reaction is supplied to reactor 65 through line 66. A number of catalysts for the water gas shift reaction are known in the art. A preferred catalyst for my process is one composed of 85 weight percent iron oxide and 15 weight percent chromic oxide, a catalyst which is not poisoned by halogens. In the water gas shift reactor, carbon monoxide is reacted with steam to produce hydrogen and carbon dioxide. The effluent from the water gas shift reactor is passed through line 67 to the acid gas removal facility 55 and delivered as synthesis gas, i.e. feed gas for synthesis of hydrocarbons, alcohols, or other oxygenated hydrocarbons, or as a source of hydrogen Carbon monoxide may be removed from the hydrogen rich product gas by a known process in which the gas stream is scrubbed with aqueous cuprous ammonium chloride if hydrogen is the desired final product.

In another preferred embodiment of this invention, PCB's and related refractory toxic wastes are completely destroyed with the simultaneous production of valuable ammonia synthesis gas or gas turbine fuel. In this embodiment, the product gas from the water gas shift reaction 65 and acid gas removal facility 55 is passed through line 68 as controlled by valve 69 to a liquid nitrogen wash tower 70. In nitrogen wash tower 70, the gas stream is washed with liquid nitrogen supplied through line 71 from an air fractionation plant (not illustrated) condensing all of the components other than hydrogen from the product gas stream and vaporizing some of the nitrogen to produce a very pure feed stream of nitrogen and hydrogen suitable for synthesis of ammonia.

A relatively small amount of the liquid nitrogen is removed from the bottom of the nitrogen wash tower 70 through line 72 together with methane, carbon monoxide, argon and any residual organic compounds from the product gas stream. The liquid nitrogen containing these components removed from gas stream 68 may be vaporized and returned through line 73 to line 17 supplying steam to burner 15. The most highly refractory organic compounds are thus recycled to complete extinction.

In another preferred embodiment of the invention, the process is carried out in an apparatus that comprises a slagging, moving-burden gasifier. The gasifier, which is preferably of the type disclosed in U.S. Pat. No. 4,052,173 or U.S. Pat. No. 4,340,397, which are incorporated herein by reference, consists of a vertical shaft furnace surmounted by a conventional lock hopper. It may be operated at pressures of 1 to 100 atmospheres but is preferably operated at atmospheric pressure. The carbonaceous fuel that is introduced through the lock hopper may be, for example, coal, coke, lignite, charcoal, or a briquetted mixture of caking coal and cellulosic waste materials. An oxygen-rich gas and steam are fed to the hearth zone of the shaft furnace in a ratio so regulated as to maintain the hearth temperature in the range of 2500° F. to 3200° F. while at the same time a toxic refractory organic substance is introduced into the hearth zone.

The refractory organic substance reacts with the oxidizing medium and steam in the partial combustion zone of the shaft furnace and any unreacted or partially reacted portion of it is subjected to further reaction with incandescent carbon at a point just above the partial combustion zone where a reducing atmosphere prevails. The hot gaseous reaction products, which comprise hydrogen, carbon monoxide, carbon dioxide, and methane, preheat the carbonaceous fuel as it descends from the lock hopper to the hearth zone of the gasifier. The inorganic components of the carbonaceous feed material are converted in the hearth zone to a molten slag which may be removed from the bottom of the shaft furnace. The gaseous products (produced in a gasifier of the type described in U.S. Pat. No. 4,052,173) are withdrawn through an exit line from the top of the shaft furnace, quenched in a conventional scrubber, and further processed as described hereinabove for recovery of useful product gases and total elimination of toxic organic materials.

When employing a gasifier of the type described in U.S. Pat. No. 4,340,397, the raw gaseous products reaching the top of the gasifier are recycled to the partial combustion zone through an internal or external conduit by means of a steam jet. At the same time, at least a portion of the resultant tar-free gas leaving the partial combustion zone is withdrawn as product at a point below the pyrolysis and coking zone of the shaft furnace.

This invention is further illustrated by the following examples.

EXAMPLE 1

The following procedure was carried out in a slagging, moving burden gasifier of the type that is disclosed in U.S. Pat. No. 4,340,397. This gasifier is a vertical shaft furnace that comprises, successively from top to bottom, a preheating and drying zone, a pyrolysis and coking zone, a high temperature reaction zone, and a partial combustion zone.

Sized coke was charged through a lock hopper on top of the gasifier and gasified by partially oxidizing it with oxygen in the presence of steam at a hearth temperature of 2900° F. to 3100° F. This was accomplished by controlling the amounts of oxygen and steam introduced into the partial combustion zone so that the exothermic partial combustion reaction was balanced by the endothermic watergas reaction.

When steady-state operation of the gasifier had been established, a hot stream of hexachlorobenzene dissolved in toluene was fed directly into the partial combustion zone at the rate of 500 kg/m²/hr.

The product gas issuing from the gasifier was analyzed for unreacted hexachlorobenzene and hydrogen chloride. These analyses, which were confirmed by gas chromatographic analysis of the off-gas, indicated that 99.993% of the hexachlorobenzene had been destroyed.

EXAMPLE 2

The following procedure was carried out in an alumina-lined reaction chamber fitted with an internal structure of zirconia rods, which was provided with a torch and a steam/oxygen tuyere. The chamber was sized to afford a total contact time of 3.5 seconds. The contact time in the torch and unobstructed reaction area of the reaction chamber was about 90 milliseconds at the feed rates employed. A 55% solution of Malathion (0,0- dimethyl dithiophosphate of diethyl mercaptosuccinate) in xylene was fed as fuel to the torch which used oxygen and steam as the reaction medium. The oxygen was fed in an amount that was less than the stoichiometric amount required for complete combustion of the Malathion solution, and the steam flow was regulated to maintain the combustion temperature in the range of 2900° F. to 3100° F.

The off-gas was quenched with aqueous milk of lime in a spray scrubber to remove acidic decomposition products.

Gas chromatographic analysis of the scrubbed gas indicated that 99.9992% of the Malathion had been destroyed.

EXAMPLE 3

The following procedure was carried out in a reaction chamber of the type described in Example 2 which fed into the high temperature reaction zone of a slagging, moving-burden gasifier of the type described in Example 1.

Polychlorinated biphenyl (a mixture of tetrachlorobiphenyl isomers) was burned in the torch, which used oxygen and steam as the reaction medium. Less than the stoichiometric amount of oxygen required for complete combustion of the polychlorinated biphenyl was fed to the torch. The steam flow was regulated to maintain the flame temperature of the torch at about 3000° F.

The combustion products issuing from the reaction chamber were brought into contact with the incandescent coke in the partial combustion and high temperature reaction zones of the gasifier. During this process, the partial combustion zone of the gasifier was maintained at about 2800° F. The residence time of the polychlorinated biphenyls in the torch and partial combustion zone of the gasifier was 50 to 100 milliseconds. The contact time of the partial combustion product with incandescent carbon was an additional 2.8 seconds.

Analysis of the product gas issuing from the gasifier showed that 99.998% of the polychlorinated biphenyls had been destroyed.

I claim:

1. A process for the noncatalytic destruction and detoxification of toxic organic waste selected from the group consisting of sewage sludge, hospital wastes, halogenated hydrocarbons, organophosphates and mixtures thereof which comprises introducing a combustible stream of said waste with water or steam into a combustion chamber maintained at a temperature in the range of 2500° to 3500° F. into admixture with oxygen in an amount sufficient to autogenously maintain said temperature and to substantially completely convert said organic waste into a reducing gas stream of partial oxidation products comprising carbon monoxide, hydrogen, and methane in a first reaction zone, and contacting the hot reducing gas stream from the first reaction zone with incandescent solid carbon at a temperature in the range of 2500° to 3500° F. in a second reaction zone, cooling the effluent gaseous products from the second reaction zone, and recovering a product gas comprising hydrogen free from organic halides.

2. A process according to claim 1 wherein the incandescent solid is coke.

3. A process according to claim 1 wherein said stream of toxic organic waste includes hospital waste admixed with a sufficient amount of combustible organic liquid to form a pumpable slurry.

4. A process according to claim 1 wherein said stream of toxic organic waste includes sewage sludge admixed with a sufficient amount of combustible organic liquid to form a pumpable slurry.

5. A process according to claim 1 wherein the effluent gases from the second reaction zone are scrubbed with water and treated for removal of carbon dioxide, hydrogen chloride, hydrogen sulfide and other acid gases from the product gas stream.

6. A process according to claim 5 wherein the water scrubbed effluent gas from the second reaction zone is subjected to a water gas shift reaction at a temperature in the range of 800° to 1000° F. prior to removal of acid gases from the product gas.

7. A process according to claim 6 wherein the product gas stream is subjected to a liquid nitrogen wash effecting removal of carbon monoxide, methane and gasiform components other than nitrogen and hydrogen from the product gas stream, and returning the carbon monoxide, methane and accompanying nitrogen and associated components to the first reaction zone in admixture with the toxic organic waste feed stream.

* * * * *